No. 686,938. Patented Nov. 19, 1901.
J. C. HENDERSON.
CART.
(Application filed Aug. 29, 1901.)

(No Model.)

Witnesses:
Louis D. Heinrichs
L. H. Momson

Inventor
James C. Henderson
by
W. Preston Williamson
Atty

UNITED STATES PATENT OFFICE.

JAMES C. HENDERSON, OF PHILADELPHIA, PENNSYLVANIA.

CART.

SPECIFICATION forming part of Letters Patent No. 686,938, dated November 19, 1901.

Application filed August 29, 1901. Serial No. 73,730. (No model.)

*To all whom it may concern:*

Be it known that I, JAMES C. HENDERSON, a citizen of the United States, residing at Philadelphia, county of Philadelphia, and State of Pennsylvania, have invented a certain new and useful Improvement in Carts, of which the following is a specification.

My invention relates to a new and useful improvement in carts, and has for its object to provide a light cart for the purpose of delivering small packages, newspapers, and the like, which is mounted upon two wheels, and the driver will stand behind the axle, and the cart will be so constructed that it will be easily balanced upon the axle either when it is empty or loaded.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
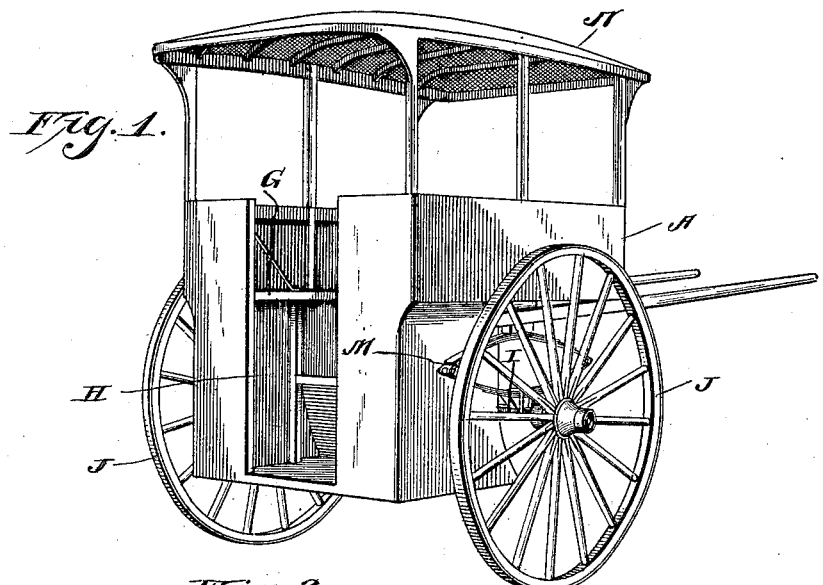
Figure 2:
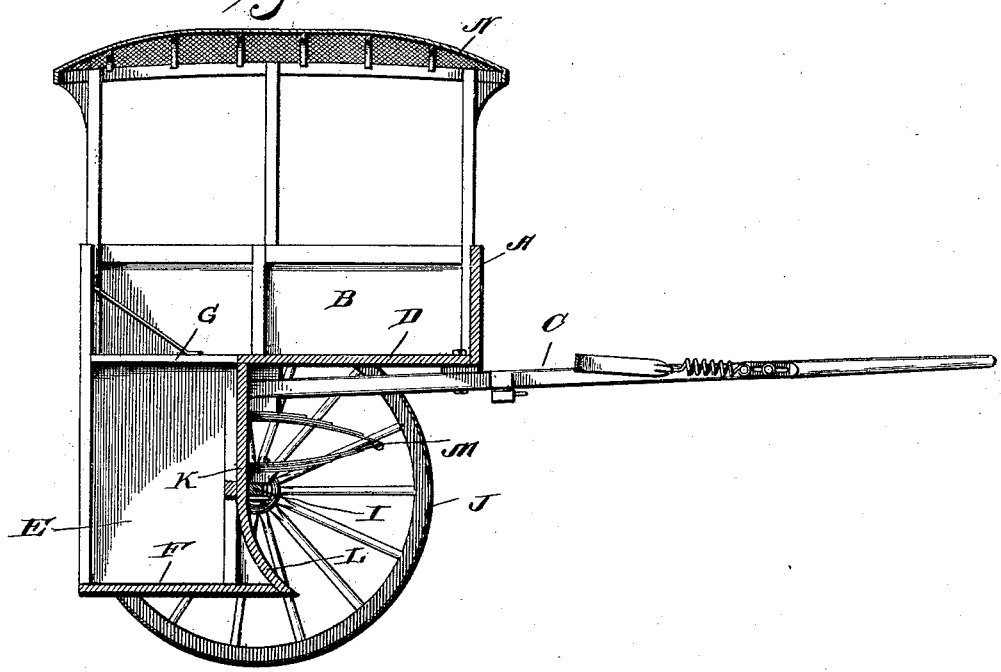

Figure 1 is a perspective view of my improved cart. Fig. 2 is a vertical longitudinal section through the same.

In carrying out my invention as here embodied A represents the body of the cart, which consists of the box B, which is arranged upon the shafts C and extends forward over the same. That portion of the box which extends forward beyond the axle is floored, so as to provide a platform D. The rear portion of the box is constructed so that it drops downward behind the axle to form the compartment E, which has the floor F located a short distance above the ground, upon which the driver stands.

The platform D extends to the rear of the cart, but above the compartment E it is cut away for the body of the driver, and thus the platform only forms a shelf G upon each side at its rear portion.

An opening H is formed in the rear of the cart for the purpose of gaining access thereto.

I is an axle, upon which the wheels are mounted. The compartment E is entirely closed in front from the platform D down to the floor F by the wall K. This wall is vertical from the platform D to the axle I and is closed against the axle at the rear thereof; but below the axle the wall K is curved forward, as indicated at L, so that the floor F will extend underneath the axle and a slight distance forward of the same.

The body of the cart is mounted upon the springs M, which in turn are secured to the axle I, and the cart is so constructed that when it is empty it will be evenly balanced upon the axle; but it is obvious that if the cart was empty and the driver should step into the compartment E it would tilt the cart rearward, causing the shafts to pull upward upon the horse; but by constructing the compartment with the curved portion L, I have provided means whereby the driver can so stand that the cart will be evenly balanced even when he is in the same, for the driver can stand close up against the wall K, so that his knees will touch the same, this being made possible because of the curved portion L, into which he can place his feet; otherwise, if the wall was straight, his toes coming in contact with the wall will keep him six or seven inches from the wall; but by being able to stand close to the wall and by leaning over the platform slightly he can keep his cart evenly balanced, and thereby ease the work of the horse, his weight thus being transferred directly over the axle. Of course when the platform D at the forward part of the cart is loaded the driver can stand in the rear of the compartment E and balance the cart in that manner.

A canopy N may be provided upon the cart, if so desired, and may be entirely closed with glass or curtains at the option of the owner.

The curved portion L of the compartment E not only allows the driver to evenly balance the cart, but also adds to the general appearance of the same.

Of course I do not wish to be limited to the exact construction here shown, as slight modifications could be made without departing from the spirit of my invention.

Having thus fully described my invention, what I claim as new and useful is—

In a cart, an axle, a pair of wheels, one journaled upon each end of the axle, a pair of springs mounted upon the axle, a body mounted upon the springs, a pair of shafts secured to the body, the body of the cart consisting of a box raised upon the axle and shafts and extending forward over the same, a compartment extending downward from the box at the rear of the axle, an opening through the rear of the cart into said compartment, a floor upon the upper box to form a platform upon which the load is to be placed, a front wall to the compartment extending vertically from said platform downward to the axle and in the rear of the same, said wall curved forward from the axle to the floor of the compartment, said curve extending underneath the axle and forward of the same, substantially as described and for the purpose specified.

In testimony whereof I have hereunto affixed my signature in the presence of two subscribing witnesses.

JAMES C. HENDERSON.

Witnesses:
L. W. MORRISON,
H. B. HALLOCK.